June 17, 1958   F. H. MUELLER   2,839,075
SERVICE T FOR PLASTIC MAINS
Filed Feb. 16, 1954   3 Sheets-Sheet 1

INVENTOR:
Frank H. Mueller,
BY Cushman, Darby & Cushman
ATTORNEYS.

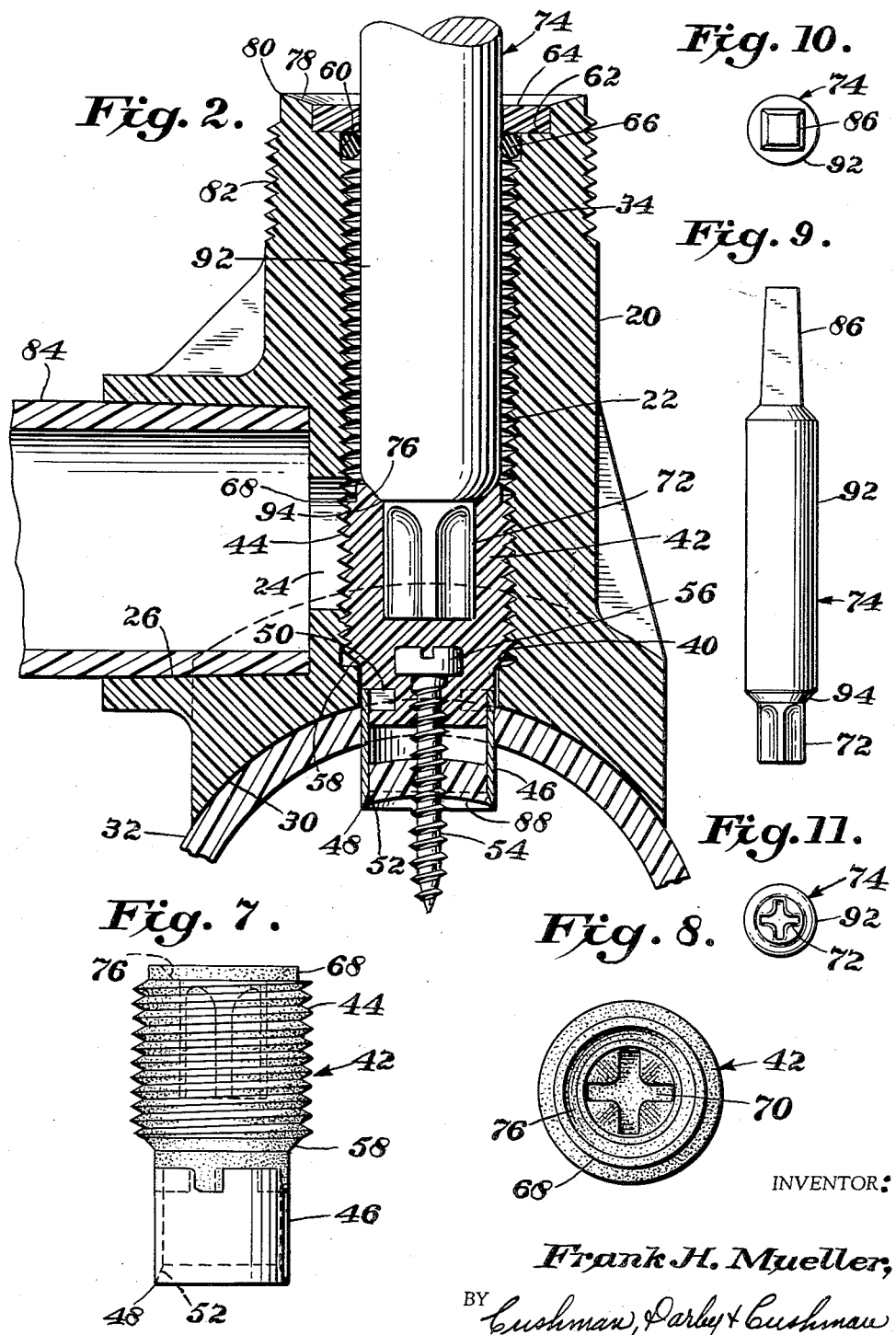

June 17, 1958 F. H. MUELLER 2,839,075
SERVICE T FOR PLASTIC MAINS
Filed Feb. 16, 1954 3 Sheets-Sheet 3
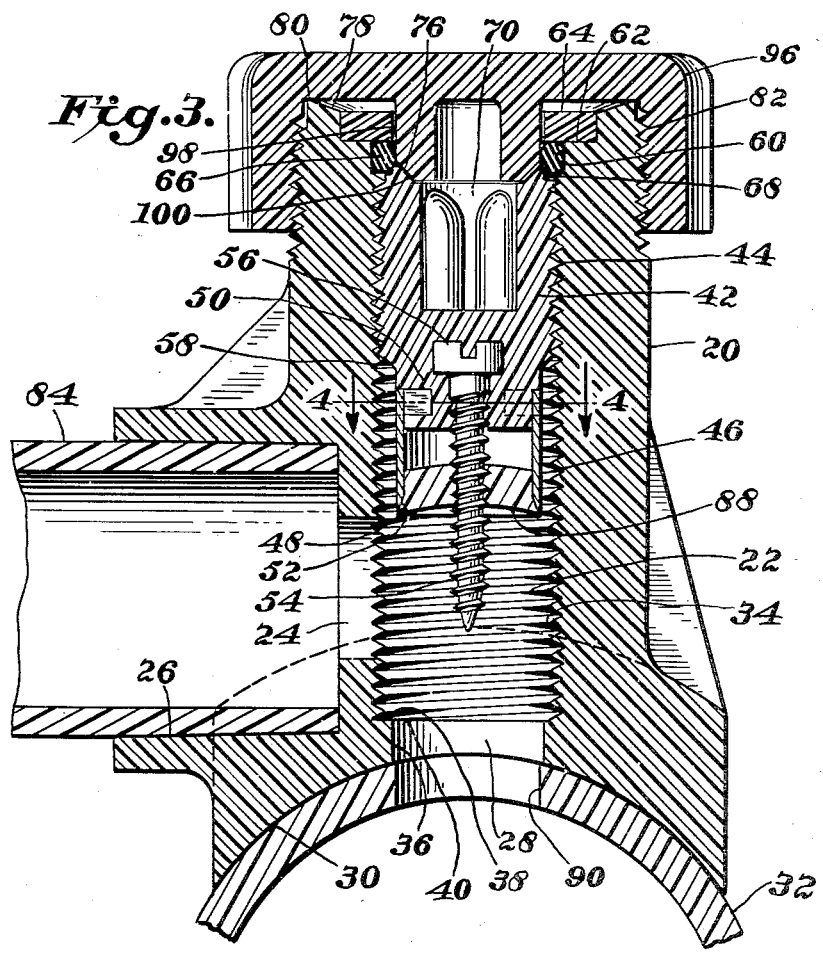
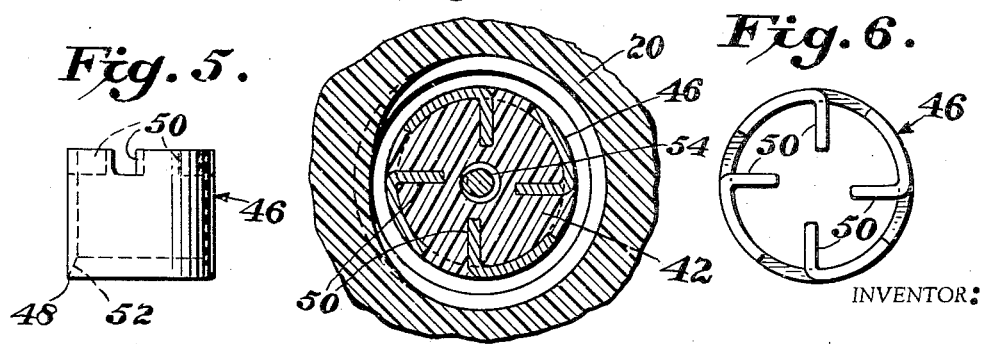
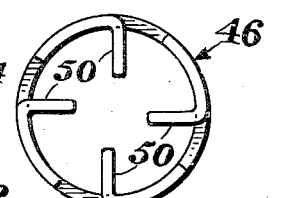
INVENTOR:
*Frank H. Mueller*,
BY *Cushman, Darby & Cushman*
ATTORNEYS.

United States Patent Office 2,839,075
Patented June 17, 1958

2,839,075

SERVICE T FOR PLASTIC MAINS

Frank H. Mueller, Decatur, Ill., assignor to Mueller Co., Decatur, Ill., a corporation of Illinois Application February 16, 1954, Serial No. 410,587

7 Claims. (Cl. 137—318)

This invention relates to a plastic service T, and more particularly to an improved plastic service tapping T attachable to a plastic main carrying fluid under pressure for connecting a plastic service pipe to the main without escape of fluid to the atmosphere Plastic mains, particularly for gas distribution, and plastic service pipes running from such mains into dwellings have relatively recently come into use. The use of such mains involves the problem of connecting service pipes thereto when the main is in service. Obviously, it is desirable to make the connection of a service pipe to a plastic main without any escape of fluid to the atmosphere, and even more desirable when the main carries gas, the escape of which would create a hazardous condition. More recently, the problem has become even more acute, because of the increasing use of higher pressures in plastic gas mains.

Plastic service and tapping T's for connecting plastic service pipes to plastic mains when the latter are in service have been developed and presented to the trade. Such T's are not entirely satisfactory, however, for various reasons, among which is included appreciable leakage of fluid from the main to the atmosphere during the connecting operation. Although such leakage is relatively small, any leakage of gas whatever obviously creates a potentially hazardous situation. Further, plastic service and tapping T's thus far developed allow chips and cuttings to fall into the main during the operation of tapping the latter. Such debris is highly undesirable in a main, since it may clog valves in the main or enter service lines and clog valves or burners in a dwelling. Additionally, known service T's for attachment to plastic mains have no means for shutoff of fluid flowing therethrough in the event that repairs are necessary to the service lines.

Accordingly, it is an object of this invention to provide an improved plastic service and tapping T for connecting a plastic service pipe to a plastic main without escape to fluid from the main to the atmosphere, even though such main carries fluid under pressure during the connecting operation.

It is another object of this invention to provide an improved plastic service T with means for shutting off the flow of fluid therethrough at any time.

It is still another object of this invention to provide an improved plastic service and tapping T which positively prevents chips or cuttings from falling into the main during or subsequent to the tapping operation.

It is still another object of this invention to provide an improved plastic service T with a double seal for the same after the main has been tapped and the connection of the service pipe effected.

Other objects and advantages of the invention will become apparent from the following description and accompanying drawings, in which:

Figure 2 is a fragmentary view corresponding to Figure 1, but showing a service pipe connected to the T and the position of the parts immediately after the main has been tapped.

Figure 3 is a view corresponding to Figure 2, but illustrating the position of the parts on the completion of a tapping operation and with a closure cap installed on the T.

Figure 4 is a sectional view taken on lines 4—4 of Figure 3.

Figure 5 is a side view of the tapping knife that is attached to the plug in the T.

Figure 6 is a top view of the knife shown in Figure 5.

Figure 7 is a side view of the plug and knife assembly shown in Figures 1 to 3.

Figure 8 is a top view of the plug shown in Figures 1 to 3.

Figure 9 is a side view of a special tool for operating the plug.

Figure 10 is an end view of the wrench-engageable end of the tool shown in Figure 9.

Figure 11 is an end view of the plug-engageable end of the tool shown in Figure 9.

Figure 1:
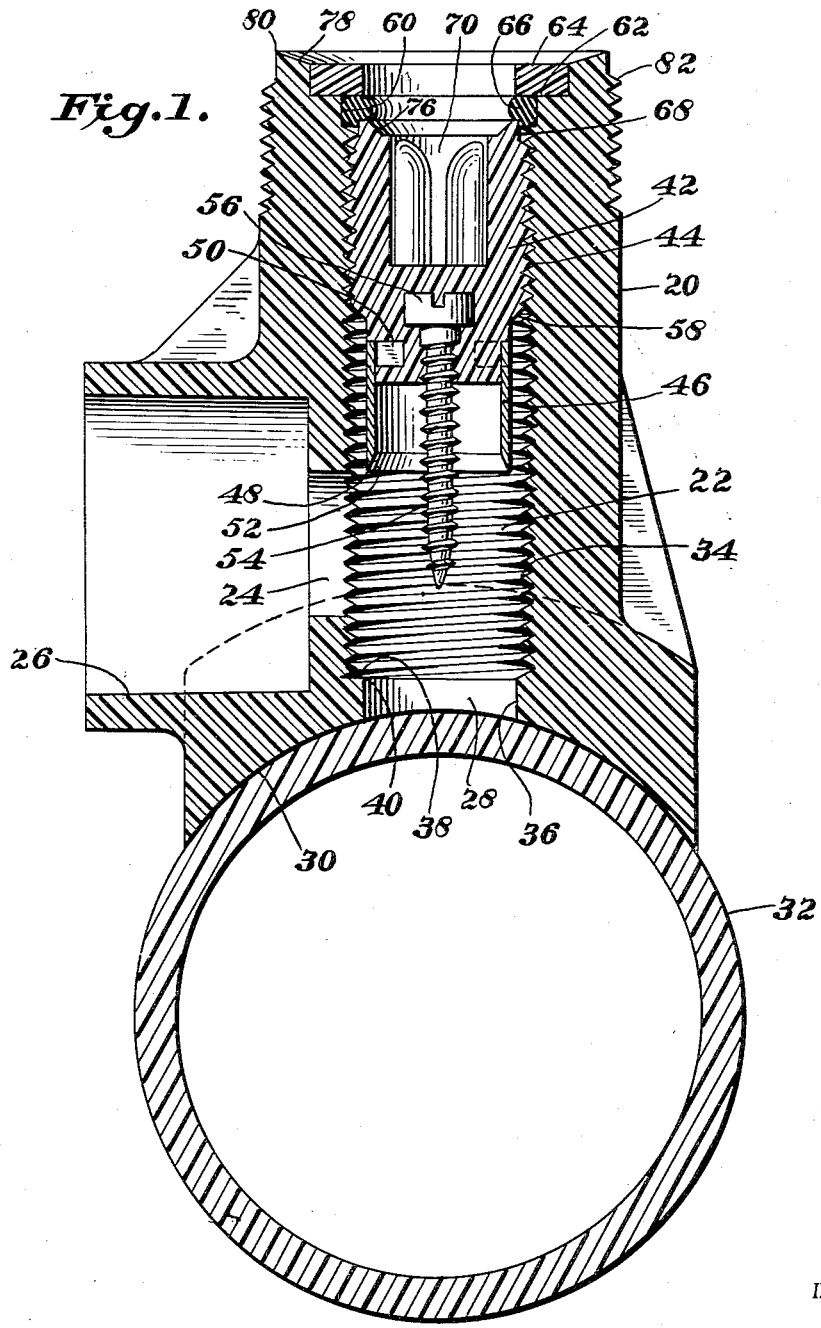
Figure 1 is a vertical sectional view through a service T embodying this invention and showing the same secured to a main before the latter has been tapped.

Referring now to the drawings, there is shown in Figure 1 a service T 20 embodying this invention and formed of any suitable plastic known in the art. The T 20 has a through bore 22 and a lateral outlet 24 which opens to the bottom of a socket 26 formed in the side of the T for the reception of an end of a service pipe, as will be explained later. One end of the T 20, i. e., that end thereof corresponding to the inlet end 28 of the throughbore 22, is provided with a saddle 30 for snug engagement with the side of a plastic main 32, so as to position the throughbore of the T radially with respect to the main. The T 20 is secured in this position on the main 32 by a solvent-welding operation well known in the art. For a major portion of its length, the throughbore 22 of the T 20 is provided with an interior thread 34, while at its inlet end 28 the bore is provided with a restriction 36 to form an inwardly-facing flat annular shoulder 38 having a relatively sharp inner edge 40. The diameter of the bore 22 at the restriction 36 is less than the crest diameter of the bore thread 34.

A plug 42 is disposed in the bore 22 and has an exterior thread 44 engaged with the bore thread 34. Secured to the inner end of the plug 42 and coaxial therewith is a tapping cutter 46 in the form of an annular metal band having a circular knife edge 48 and with the base of the band encompassing an end section of the plug of reduced diameter. Preferably, the plug 42 is also formed of plastic, and the cutter 46 may be secured thereto by radially-inwardly-extending struck-out wings 50 which are molded into the plastic material of the plug, as is shown in Figures 1 and 4. The cutter 46 projects beyond the end face of the plug 42 a distance somewhat greater than the thickness of the wall of the main 32 and has a smooth outer surface of uniform diameter throughout its entire length, which diameter is slightly less than that of the bore 22 at the restriction 36. The knife edge 48 of the cutter 46 is formed by an inner bevel 52, for reasons later explained.

Coaxially fixed to the end of the plug 42 concentric with the cutter 46 is a pointed metal screw 54, the thread of which preferably is of the same pitch as that of the thread 44 on the plug. The screw may be secured to the plug 42 by having its head 56 molded into the plastic material of the latter, as is shown in Figure 1 of the drawings. Preferably, the screw 54 projects somewhat beyond the plane of the knife edge 48 of the cutter 46 to serve as an initial centering and steadying means for the latter during the tapping operation, later described.

Between the base of the cutter 46 and the exterior thread 44 on the plug 42, the latter is provided with a frustoconical shoulder or surface 58.

At its outer end and adjacent the thread 34, the bore 22 in the T 20 is provided with a circumferential groove 60, substantially rectangular in radial section. For manufacturing convenience, the groove 60 is formed by providing the outer end of the T 20 with a smooth-walled counterbore 62. The bottom of the latter is provided with a counterbore, and a flat plastic washer 64 is solvent-welded in the counterbore 62 over the inner counterbore to form the groove 60. The inner diameter of the washer 64 is at least as small as, and preferably slightly less than, the crest diameter of the bore thread 34. Within the groove 60 and contacting the bottom thereof is disposed a resilient packing ring normally circular in radial section and known in the art as an O-ring 66, which usually is made of a synthetic rubber material, such as neoprene, or the like. The width of the groove 60 is somewhat greater than that of the O-ring 66, when relaxed, while the inner diameter of the latter is less than the inner diameter of the washer 64. At its outer end and beyond its thread 44, the plug 42 is provided with a short smooth-walled cylindrical extension 68 (Figure 7) having a relatively-sharp peripheral end edge of greater diameter than the inner diameter of the relaxed O-ring 66 but of smaller diameter than that of the center line of a radial section of the ring. The outer end of the plug 42 also is provided with a coaxial cross-like socket 70, similar to that of a Phillips screw, for the reception of a complementarily-shaped cross-like end 72 of a special operating tool 74, shown in Figures 2 and 9 to 11. Outwardly of the socket 70, the outer end of the plug 42 is provided with an outwardly-flaring counterbore 76, for reasons later described.

Outwardly of the washer, the outer end of the T is somewhat dished, as at 78, to form a relatively-sharp peripheral end edge 80 and provided with an exterior thread 82. That section of the bore 22 extending between the lateral outlet 24 and the O-ring 66 is of sufficient length to completely receive the plug 42 and its knife 46 so as to provide unobstructed communication between the inlet end 28 of the bore 22 and the lateral outlet 24, when the plug is in the position shown in Figure 1.

In using a service T embodying this invention to connect a plastic service pipe to a plastic main, the T 20 is solvent-welded to the main 32 in the position shown in Figure 1 and with the plug 42 also in the position shown therein, wherein the outer end of the plug engages the inner side of the O-ring 66 somewhat radially-inwardly of the radial section center line thereof. After the T 20 has been secured to the plastic main 32, the end of a service pipe 84 is inserted into the socket 26 in the T and solvent-welded therein, as shown in Figure 2. Thereafter, the pipe 84 may be completedly installed and pressure-tested. In this connection, it will be seen that because the plug 42 is in tight engagement with the inner side of the O-ring 66, a tight seal is effected between the plug and the T, so that no pressure can escape from the service pipe 84 during the pressure-testing thereof. Also the "radially-inward" engagement of the plug extension 68 with the O-ring 66 prevents radial collapse of the latter, i.e., being blown out of the groove 60 by the entrance of pressure between the bottom of the groove and the O-ring. It also will be seen that the O-ring 66 prevents the removal of the plug 42 from the bore 22 of the T 20.

After the service pipe 84 has been installed, the special tool 74 is engaged with the socket 70 in the plug 42 and rotated by engaging its non-circular end 86 by an appropriate turning tool (not shown), such as a brace. Thus, the plug 42 is screwed down until the pointed end of the screw 54 engages the plastic main 32. Continued turning and advancing movement of the plug 42 toward the main 32 threads the screw 54 into the latter, and at the same time the circular cutter 46 projects through the bore restriction 36 and makes an annular cut through the main, as shown in Figure 2. The coupon 88, i.e., the central disc within the cut formed by the cutter 46, thus becomes threaded onto the screw 54, and at the same time, because only the inner side of the knife edge 48 of the cutter 46 is bevelled, the coupon is wedged tightly within the cutter. Consequently, when the plug is unscrewed and retracted back into the bore 22, as is later explained, the coupon 88 is withdrawn therewith, leaving a hole 90 in the main 32, as shown in Figure 3.

In addition to aiding in the withdrawal of the coupon 88 and permanent retention of the same in the cutter 46, the bevelling of only the inner side of the knife edge 48 serves to confine strain and deformation of the plastic wall of the main 32 during the cutting operation solely to the coupon. Hence, the wall of the main 32 surrounding the cut is not liable to be fractured by the cutting operation. In this same connection, it is pointed out that the knife edge 48 smoothly cuts the main 32 without the formation of any cuttings or chips which might fall into the latter and that when the coupon 88 is withdrawn the resulting hole 90 in the main is clean-edged. It also is pointed out that after the cutter 46 has cut completely through the side wall of the main 32, as is shown in Figure 2, further advance of the plug 42 into the main is limited by the engagement of the frusto-conical surface 58 on the plug with the shoulder 38 formed by the restriction 36 at the inlet end 28 of the T bore 22. Hence, the plug 42 cannot be lost into the main 32 by screwing it completely out of the bore 22. In addition to its coupon-retaining and cutter-centering function, the screw 54 serves to hold the T 20 tightly against a main during a tapping operation, to thus preclude breaking the solvent-weld therebetween by the reaction force of the cutter 46 on the T. Hence, it is desirable for the screw 54 to project a considerable distance beyond the knife edge 48 so as to obtain a firm grip on a main before the knife edge engages therewith.

The shank 92 of the tool 74, between its plug-engaging end 72 and its wrench-engaging end 86 has a smooth cylindrical surface of slightly smaller diameter than the inner diameter of the washer 64 and of slightly greater diameter than the inner diameter of the O-ring 66 when the latter is relaxed. Consequently, after the main 32 has been tapped and pressure escapes therefrom into the throughbore 22, the tool 74 has tight-sealing engagement with the O-ring 66, to positively prevent the escape of pressure fluid from the outer end of the T bore while the plug 42 is being unscrewed back to the position shown in Figure 3. As the plug reaches this position, its outer end again engages the O-ring 66 to make a tight seal therewith, so that after the tool 74 is removed the escape of pressure fluid to the atmosphere is precluded. Between its plug-socket-engaging end 72 and its shank 92, the tool 74 has a frusto-conical surface 94 which fits within and is complementary to the flaring counterbore 76 in the outer end of the plug 42. Consequently, the shank 92 of the tool 74 constantly seals with the O-ring 66 even when the outer end of the plug 42 engages with the inner side of the latter. It also will be noted that the tool shank 92 restricts radial-inward flow or deformation of the O-ring 66 as the plug 42 is screwed thereagainst, to thereby automatically limit the extent of deformation of the O-ring by the plug. The desirability of such limitation will be explained later.

After the tapping operation has been completed, in order to protect the O-ring seal and to make doubly sure that no leakage takes place, a cap 96 is threadedly engaged over the outer end of the T 20, as shown in Figure 3. The cap is provided on its undersurface with a central circular boss 98 that has a bevel 100 on its inner end complementary to the flared counterbore 76 in the end of the plug 42. Inwardly of the bevel 100 on the boss 98, the latter has a smooth cylindrical exterior surface of substantially-uniform diameter that is slightly smaller than the inner diameter of the washer 64 but somewhat greater than the inner diameter of the O-ring 66 when the latter is relaxed. Consequently, when the cap 96 is screwed onto the service T 20, the cylindrical surface of its central boss 98 makes sealing engagement with the inner periphery of the O-ring 66, so that, in effect, a double seal is made with the O-ring that positively precludes the escape of pressure fluid from the main to the atmosphere. In this connection, it is pointed out that the limitation of he deformaion of the O-ring 66 effected by the tool shank 92 makes it possible for the boss 98 to enter and seal with the O-ring. It further is pointed out that the undersurface of the cap 96 tightly engages with the sharp outer end edge 80 of the T 20 for the formation of another seal at this point.

It also will be seen that, in the event it is desired to shut off flow from the main 32 to the service pipe 84 at any time for the purpose of effecting repairs or the like to the service pipe, the cap 96 can be removed and the special tool 74 used to screw the plug 42 toward the main 32 until the frusto-conical surface 58 on the plug makes sealing engagement with the sharp edge 40 of the shoulder 38 in the bore 22 of the T 20. Thus, the flow of fluid from the main 32 into the bore 22 of the T 20 can be prevented. In this connection, it is again pointed out that, during the operation of screwing and unscrewing the plug 42 between the positions shown in Figures 2 and 3, the engagement of the shank 92 of the special tool 74 with the O-ring 66 precludes the escape of pressure fluid from the main 32 to the atmosphere.

Particular attention is called to the importance of the O-ring 66 in providing an effective seal against escape of fluid after the service installation has been made. Plastics, though effective for their intended purpose here, expand and contract with temperature changes to a much greater degree than metals usually used in service T's. Further, plastics tend to cold flow or creep somewhat with time. Accordingly, the plug 42 and the cap 96 alone would not make an effective relatively permanent seal. With the addition of the O-ring 66, however, the tightness of the seal is unaffected by the above-mentioned characteristics of plastics.

It thus will be seen that the objects of this invention have been fully and effectively accomplished. It will be realized, however, that various changes may be made in the specific embodiment shown and described to illustrate the principles of the invention without departure from such principles. Therefore, this invention includes all modifications encompassed within the spirit and scope of the following claims.

I claim:

1. A fitting attachable to plastic pipes comprising: a plastic service T having a throughbore and a lateral outlet, one end of said T being shaped for engagement with and solvent-welding to a plastic main; an interior thread in said bore; a plug having an exterior thread engaged with said bore thread; a circular cutter of smaller diameter than, and coaxially fixed to one end of, said plug for projection out of the inlet end of said bore at said one T end and cutting a hole in the main by screwing said plug theretoward; interengageable stop means on said plug and in said bore inlet end for limiting the extent of projection of said cutter out of said bore; interengageable stop means on said plug and in the other end of said bore for preventing removal of said plug from said bore other end; and an imperforate closure cap threaded onto the other end of said T.

2. The structure defined in claim 1 in which the stop means in the bore inlet end comprises an interior shoulder having a sharp inner edge disposed between the lateral outlet and said bore inlet end, and the corresponding stop means on the plug comprises a frusto-conical surface sealingly engageable with said edge to shut off flow through the T from the main to the lateral outlet.

3. A fitting attachable to plastic pipes comprising: a plastic service T having a throughbore and a lateral outlet, one end of said T being shaped for engagement with and solvent-welding to a plastic main; an interior thread in said bore; a plug having an exterior thread engaged with said bore thread; means fixed on one end of said plug for projection out of one end of said bore at said one T end and cutting a hole in the main by screwing said plug theretoward; a circumferential groove in said bore adjacent the other end thereof; an O-ring in said groove; means defining a non-circular socket in the other end of said plug; and a turning tool having an end complementary to and detachably engaged in said socket, said tool projecting through said O-ring out of said bore and having a smooth cylindrical shank of slightly greater diameter than the inner diameter of said O-ring and sealingly engaged with the inner periphery thereof.

4. The structure defined in claim 3 including circumferential means on the other end of the plug sealingly engageable with the inner side only of the O-ring.

5. A fitting attachable to plastic pipes comprising: a plastic service T having a throughbore and a lateral outlet, one end of said T being shaped for engagement with and solvent-welding to a plastic main; an interior thread in said bore; a plug having an exterior thread engaged with said bore thread; means fixed on one end of said plug for projection out of one end of said bore at said one T end and cutting a hole in the main by screwing said plug theretoward; a turning tool detachably engaged with the other end of said plug and having a shank projecting out of the other end of said bore, said tool being removable through said bore other end; and sealing means mounted on said T at said other bore end engaging the periphery of said tool shank.

6. A fitting attachable to plastic pipes comprising: a plastic service T having a throughbore and a lateral outlet, one end of said T being shaped for engagement with and solvent-welding to a plastic main; an interior thread in said bore; a plug having an exterior thread engaged with said bore thread; means on one end of said plug for projection out of one end of said bore at said one T end and cutting a hole in the main by screwing said plug theretoward; a circumferential groove in said bore at the other end of said T; an O-ring in said groove, the inner diameter of said ring, when relaxed, being less than that of the crest diameter of said bore thread; an interrupted circumferential end edge on the other end of said plug of greater diameter than the inner diameter of said ring, when relaxed, for sealing engagement with the inner side thereof; an exterior thread on the other end of said T; and a closure cap engageable with said T exterior thread and having an inner circular boss of slightly greater diameter than the inner diameter of said O-ring, when relaxed, for sealing engagement with the inner periphery thereof.

7. A fitting attachable to plastic pipes comprising: a plastic service T having a throughbore and a lateral outlet, one end of said T being shaped for engagement with and solvent-welding to a plastic main; an interior thread in said bore; a plug having an exterior thread engaged with said bore thread; circular cutter means fixed on one end of said plug for projection out of one end of said bore at said one T end and for cutting the hole in the main by screwing said plug theretoward; means defining a circumferential groove in said bore adjacent the other end thereof; an O-ring disposed in said groove for sealing engagement with the other end of said plug; means defining a non-circular socket in said plug other end; and a turning tool having an end complementary to and detachably engaged in said plug socket, said tool projecting through said O-ring out of said bore and having a smooth cylindrical shank of slightly greater diameter than the inner diameter of said O-ring, when relaxed, and sealingly engaged with the inner periphery of said O-ring, said tool being removable through said bore other end.

References Cited in the file of this patent

UNITED STATES PATENTS

| | | |
|---|---|---|
| 808,408 | Sparks | Dec. 26, 1905 |
| 1,631,564 | Van Raalte | June 7, 1927 |
| 2,050,985 | Trickey | Aug. 11, 1936 |
| 2,498,831 | Veitch | Feb. 28, 1950 |
| 2,515,260 | Pichler | July 28, 1950 |
| 2,660,192 | Hunter | Nov. 24, 1953 |
| 2,700,307 | Thoresen | Jan. 25, 1955 |
| 2,736,335 | Webber | Feb. 28, 1956 |

FOREIGN PATENTS

| | | |
|---|---|---|
| 505,046 | Great Britain | May 4, 1939 |